United States Patent [19]

Portalupi et al.

[11] Patent Number: 4,526,647
[45] Date of Patent: Jul. 2, 1985

[54] APPARATUS FOR FEEDING STRIP MATERIAL FOR APPLICATION TO A DRUM

[75] Inventors: Steven J. Portalupi, Akron; Robert S. Riggs, Stow, both of Ohio

[73] Assignee: The Goodyear Tire & Rubber Company, Akron, Ohio

[21] Appl. No.: 520,487

[22] Filed: Aug. 4, 1983

[51] Int. Cl.³ .................... B29H 17/10; B65H 17/08
[52] U.S. Cl. .................. 156/406.4; 156/412; 156/421; 156/405.1; 156/133; 83/422; 198/694; 226/93; 271/84
[58] Field of Search ........... 156/405.1, 406.4, 412, 156/421, 128.1, 128.6, 130, 133–134; 83/422; 198/694; 226/93; 271/84

[56] References Cited

U.S. PATENT DOCUMENTS

| 3,479,238 | 11/1969 | Kehoe et al. | 156/111 |
| 3,989,565 | 11/1976 | Appleby et al. | 156/406.4 |
| 4,371,410 | 2/1983 | Stevens | 156/405.1 |
| 4,448,627 | 5/1984 | Satoh et al. | 156/405.1 |

FOREIGN PATENT DOCUMENTS

| 2108060A | 5/1983 | United Kingdom . |
| 2108442 | 5/1983 | United Kingdom . |

Primary Examiner—Lois E. Boland
Attorney, Agent, or Firm—Frederich K. Lacher; T. P. Lewandowski

[57] ABSTRACT

An apparatus and method wherein strip material is clamped to a shuttle finger slidably mounted in a shuttle casing which in turn is slidably mounted on a strip applier frame. The shuttle casing and shuttle finger are movable simultaneously from a retracted first position to a second position with the end of the shuttle casing adjacent an applicator roll. The shuttle finger is then movable by itself from the second position to a third position for transferring a tongue portion of the strip onto the applicator roll. The tongue portion may then be elevated into clamping engagement with the drum and the strip released from the shuttle finger. The shuttle casing and shuttle finger may then be returned to the first position, the drum rotated a predetermined amount to partially wrap the strip around the drum and the strip cut at a predetermined location whereupon the drum is rotated to fully wrap the strip of flexible material around the drum. Guide members at the front edges of the feed path are retractable to permit movement of the shuttle casing into close proximity with the applicator roll. Also a cycle reset clamping assembly is provided for clamping a portion of the strip of flexible material to the applicator roll to allow the shuttle casing to move to the retracted position for cutting of the strip of flexible material in that position when the applicator roll is not elevated into contact with the drum.

12 Claims, 6 Drawing Figures

APPARATUS FOR FEEDING STRIP MATERIAL FOR APPLICATION TO A DRUM

This invention relates generally to the application of strip components to a transfer drum or building drum of a tire building machine.

Strip appliers used heretofore have utilized a one-piece shuttle with a shuttle finger for extending the strip material to an application roll across a gap containing the cutting plane of the cutter in an unsupported condition. With strip material which has sufficient stiffness the gap between the cutter and applicator roll has been bridged satisfactorily; however, with more flexible strip materials the apparatus used heretofore has not provided the necessary support and this has resulted in guiding and ball up problems causing interruptions in the manufacturing process. The present invention is directed to an apparatus and method for feeding strip material for application to a drum in which the strip material is supported continuously. Also there is continuous guiding of the strip material so that it will be positioned on the drum surface with precision. Provisions are also made for clamping the strip to the applicator roll when it is necessary to reset the strip application cycle.

In accordance with one aspect of this invention there is provided an apparatus for feeding a strip of flexible material for application to a drum surface comprising a supporting structure having an applicator roll for positioning adjacent the drum structure for movement from a first position spaced from the applicator roll to a second position in close proximity to the applicator roll, a shuttle finger for supporting the strip connected to the shuttle casing for movement relative to and with the shuttle casing, clamping means movable with the shuttle finger for clamping the strip to the shuttle finger, means for moving the shuttle casing and the shuttle finger between the first position and the second position, stop means for preventing additional movement of the casing and release means for permitting additional movement of the shuttle finger separately toward the applicator roll to a third position for extending a tongue portion of the strip onto the applicator roll.

In accordance with another aspect of the invention there is provided a method of feeding a strip of flexible material for application to a drum surface with an applicator roll on an applier frame comprising:

(a) supporting the strip on a shuttle finger with a tongue portion of the strip adjacent an end of a shuttle casing;

(b) moving the shuttle casing with the shuttle finger on the applier frame from a first position spaced from the applicator roll to a second position in close proximity to the applicator roll; and then (c) moving the shuttle finger relative to the shuttle casing toward the applicator roll to a third position to extend the tongue portion of the strip beyond the shuttle casing and onto the applicator roll.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 1:
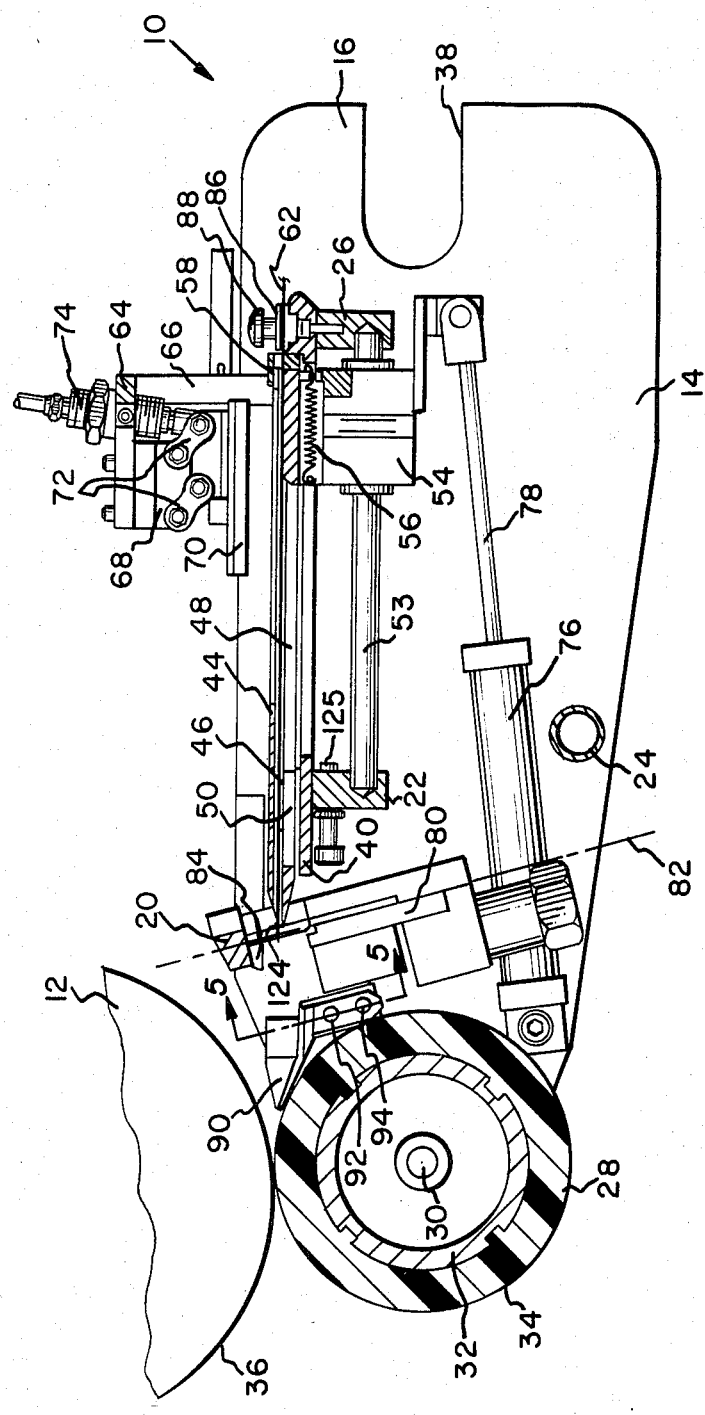
FIG. 1 is a fragmentary sectional view of the left-hand strip applier head taken along the line 1—1 in FIG. 3 but with the shuttle casing in the retracted position.
Figure 2:
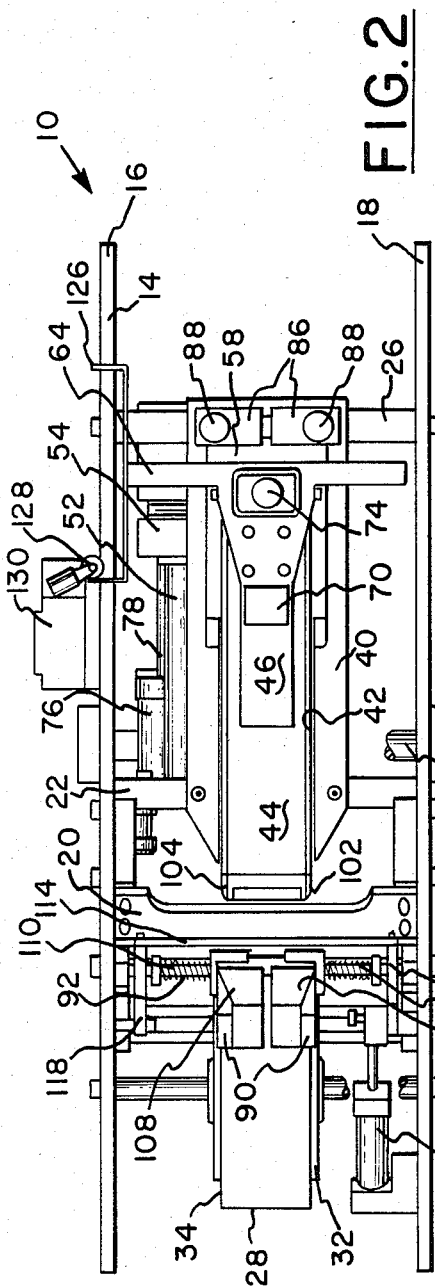
FIGS. 2 and 3 are fragmentary plan views of the left- and right-hand strip applier heads for a typical tire building operation. The right hand applier head shown in FIG. 2 has the shuttle casing in the retracted position and the left hand applier head shown in FIG. 3 has the shuttle casing in the extended position.

Referring to FIGS. 1 and 2 a strip applier apparatus 10 is shown for applying a strip of flexible material to the right-hand side of a tire building drum 12. The description of the right-hand strip applier apparatus 10 will also apply to the left-hand strip applier apparatus 10' shown in FIG. 3 which is the same apparatus but with certain parts positioned on opposite sides of the apparatus for reasons of access and space. In the following description the components of the left-hand apparatus 10' of FIG. 3 will be given the same numerals and described as though they were the same as the components of the right-hand apparatus 10 of FIG. 2 even though some of the components are on opposite sides of the two appliers shown in FIGS. 2 and 3.

The strip applier apparatus 10 has a supporting structure such as frame 14 having a pair of side plates 16 and 18 in generally parallel relationship connected by suitable connecting members such as tie bar 20, front support bar 22, shaft 24 and rear tie bar 26.

An applicator roll 28 is rotatably mounted on a shaft 30 extending between the side plates 16 and 18 at the front end of the apparatus 10. The applicator roll 28 may have a hub 32 on which a tire 34 of suitable resilient material is mounted for positioning adjacent a drum surface 36 of the tire building drum 12, shown schematically in FIG. 1. The side plates 16 and 18 may have slots 38 at the rear end of the applier frame 14 for receiving a shaft (not shown) about which the frame may rotate between an elevated position and a lowered position of the applicator roll 28. In the elevated position, the applicator roll 28 is raised into engagement with the drum surface 36 as shown in FIG. 1 and in the lowered position (not shown) there is a space between the applicator roll and the drum surface. Suitable power means such as a piston and cylinder assembly (not shown) may be connected to the shaft 24 for raising and lowering the applier frame 14.

A support plate 40 may be mounted on the front support bar 22 and rear tie bar 26. The support plate 40 has a channel 42 in which a shuttle casing 44 is slidably mounted. Within the shuttle casing 44 a shuttle finger 46 is slidably mounted and may have a rib 48 extending into a groove 50 in the shuttle casing 44 for guiding the movement of the shuttle finger in the casing.

Shafts 52 and 53 extend between the front support bar 22 and the rear tie bar 26 and through a housing block 54 which is slidably mounted on the shafts. The shuttle finger 46 is fastened to the housing block 54 for movement with the block along the shafts 52 and 53. The shuttle casing 44 is connected to the shuttle finger 46 by a release means such as spring 56 for moving the shuttle casing with the shuttle finger to the left, as shown in FIG. 1, until a stop bar 58 mounted on the shuttle casing engages stop means such as adjustable stops 60 mounted on the support plate 40. The spring 56 will then permit additional movement of the shuttle finger 46 to the left to the position shown in FIG. 4 while maintaining the shuttle casing in the position shown.

Clamping means are provided for clamping a strip of flexible material 62 (shown only in FIGS. 1, 4 and 6) against the shuttle finger 46. The clamping means include a shuttle tie bar 64 supported by vertical standoff members 66 at the ends of the shuttle tie bar which are in turn supported by the housing block 54. A clamping plate 68 is supported by the shuttle tie bar 64 and is connected to a clapper plate 70 by parallel links 72 for movement of the clapper plate in a horizontal position into engagement with the strip of flexible material 62. Actuation of the clapper plate 70 is provided by a clamping piston and cylinder assembly 74 supported on the shuttle tie bar 64 and actuated by suitable fluid such as factory air.

A shuttle cylinder 76 is pivotally mounted on the side plate 16 and has a piston rod 78 pivotally connected to the housing block 54 for moving the block along the shafts 52 and 53. Preferably the shuttle cylinder 76 is a double-acting cylinder actuated by a suitable fluid such as factory air.

Knife cutting means such as air-actuated knife 80 is mounted between the side plates 16 and 18 for movement of the knife in a cutting plane 82 against an anvil 84 mounted on the tie bar 20.

Figure 3:
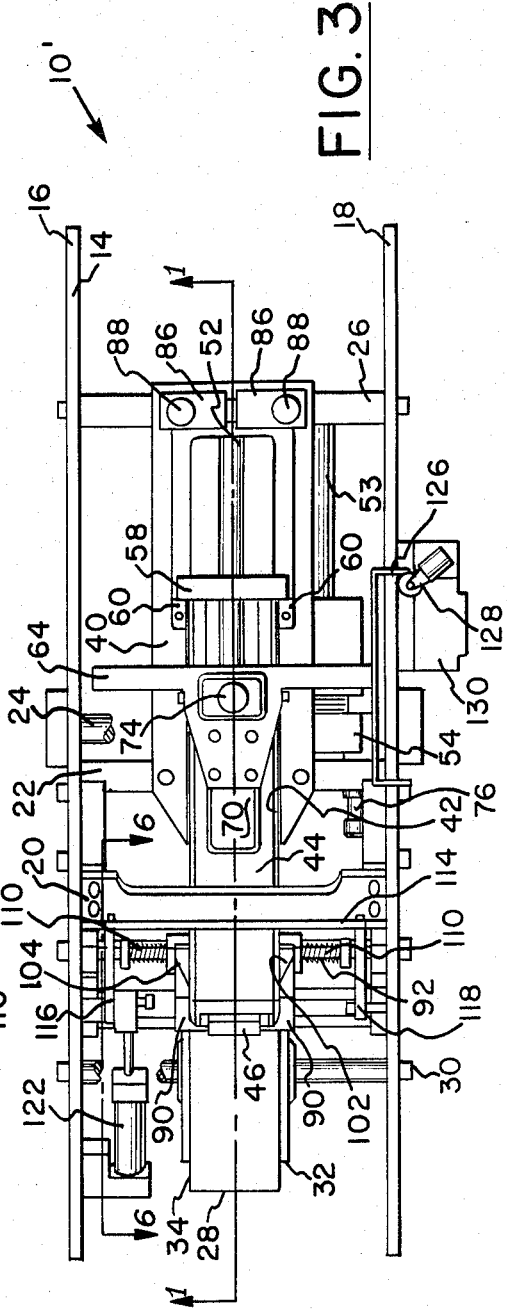
Figure 5:
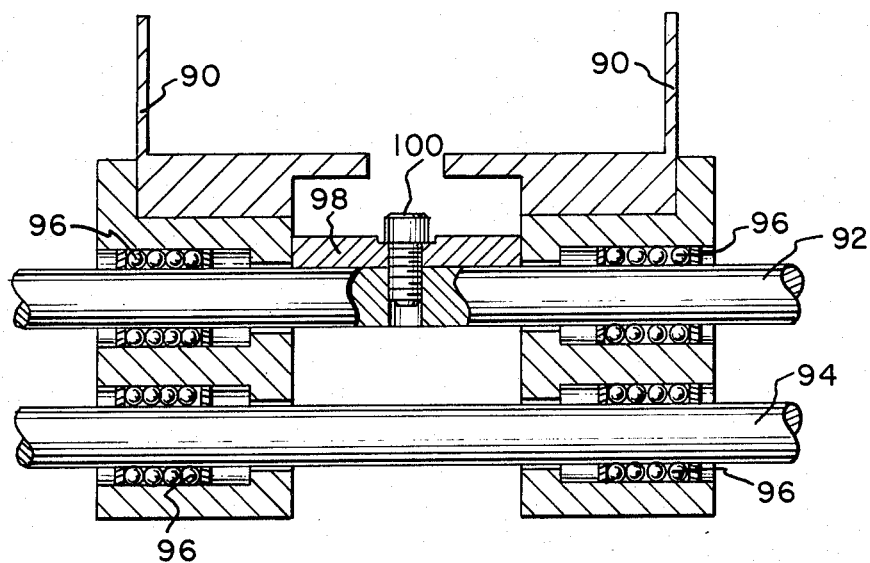
FIG. 5 is an enlarged fragmentary sectional view taken along the line 5—5 in FIG. 1 showing the mounting of the front end guide members.

The strip of flexible material 62 is guided into the shuttle casing 44 over a preguide apparatus (not shown) at the rear of the apparatus 10 and then between the rear stock guides 86 which may be adjustable for different widths and are maintained in position by hand knobs 88. Front guide means are provided at the front end of the apparatus 10 and may include a pair of guide members such as front end guides 90 slidably mounted on shafts 92 and 94 on ball bushings 96 as shown in FIGS. 2, 3 and 5. A spacer 98 may be fastened to the shaft 92 as by a screw 100 to position the guide members 90 at the edges of the feed path to guide the tail end of the strip of material 62 as it is applied to the drum surface 36 by the applicator roll 28 in the position shown in FIG. 2.

The shuttle casing 44 has spreading means including tapered sides 102 and 104 for engaging tapered surfaces 106 and 108 of the front end guides 90 upon movement of the shuttle casing from the retracted position shown in FIG. 2 to the extended position shown in FIG. 3. Resilient means such as a pair of springs 110 may be mounted on the shaft 92 for permitting spreading movement of the front end guides 90 during movement of the shuttle casing 44 to the extended position shown in FIG. 3 and then returning the front end guides to the operating position shown in FIGS. 2 and 5 after the shuttle casing has been returned to the retracted position.

Figure 6:
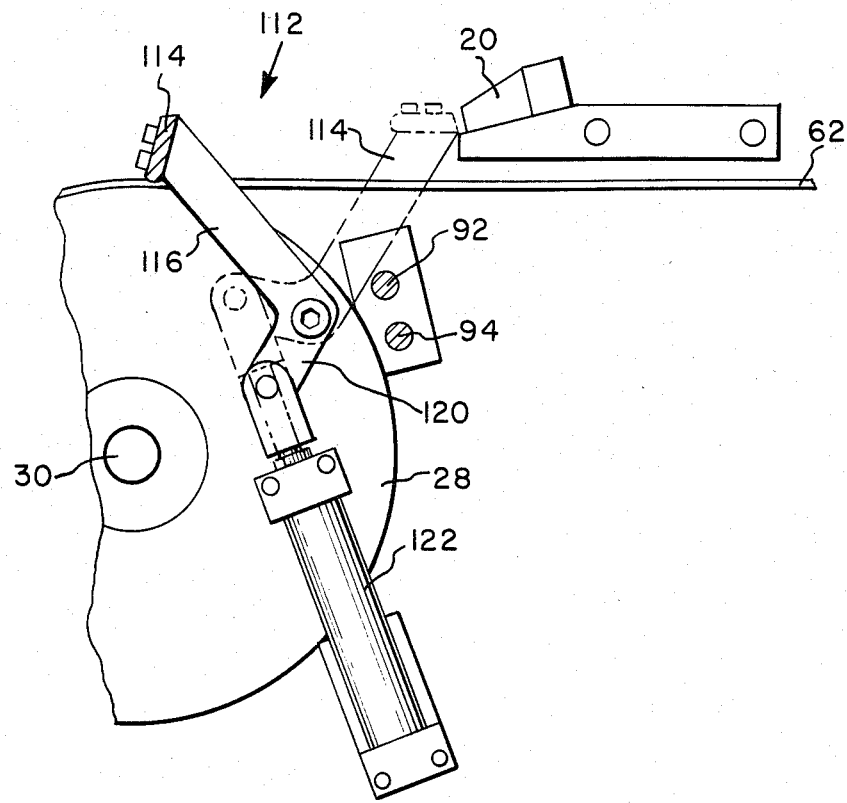
FIG. 6 is a fragmentary sectional view of the cycle reset clamp taken along the line 6—6 in FIG. 3 showing the cycle reset clamp in the clamping position in full lines and in the storage position in dotted lines.

To facilitate the operation of the strip applier apparatus 10, it is sometimes necessary to clamp the strip of flexible material 62 against the applicator roll 28 and for this purpose a cycle reset clamp assembly 112, shown in FIG. 6, having a clamping rod 114 supported on a pair of rotatable link members 116 and 118 may be provided. The link members 116 and 118 are pivotally connected to the side members 16 and 18 and one of the link members 116 may be a bell crank having an arm 120 connected to a piston and cylinder assembly 122 for moving the clamping rod 114 from the clamping position shown in full lines in FIG. 6 to the storage position shown in dotted lines in FIG. 6 and in full lines in FIGS. 2 and 3. The piston and cylinder assembly 122 may be a double-acting cylinder actuated by suitable fluid such as factory air.

In operation the strip of flexible material 62 is positioned in the shuttle casing 44 over the shuttle finger 46 as shown in FIG. 1. Normally the strip of flexible material 62 comes from a supply roll mounted on a servicer and containing enough material for wrapping around the drum surface 36 many times to build a large number of tires. In this application, one strip 62 is fed by the right-hand strip applier apparatus 10 onto one edge of the drum surface 36 and another strip 62 is fed by the left-hand strip applier apparatus 10' onto an opposite edge of the drum surface. The following description will be confined to the operation of the right-hand strip applier apparatus 10; however, it also applies to the substantially simultaneous operation of the left-hand strip applier apparatus 10'.

The applicator roll 28 is lowered to a position spaced from the drum surface 36 as by actuating the piston and cylinder assembly connected to shaft 24 so that the frame 14 will pivot downwardly about the shaft in slots 38. The strip of flexible material 62 is then clamped to the shuttle finger 46 by actuating the clamping piston and cylinder assembly 74 causing the clapper plate 70 to move downwardly into engagement with the upper surface of the strip of flexible material. The shuttle cylinder 76 is then actuated to move the piston rod 78 to the left, as shown in FIG. 1, causing the housing block 54 to move to the left and carry the shuttle finger 46 along with the clamping plate 68 and clapper plate 70 to move the strip of material 62 to the left. From the first position shown in FIGS. 1 and 2, the shuttle finger 46 and the shuttle casing 44 are moved to a second position at which the stop bar 58 of the shuttle casing engages the adjustable stops 60 to maintain the shuttle casing in close proximity to the applicator roll 28. The piston rod 78 continues to move the housing block 54 and the shuttle finger 46 to the left, as shown in FIG. 1, which is permitted through extension of the spring 56 connecting the shuttle casing 44 and shuttle finger. During this movement from the second position to a third position of the shuttle finger 46, shown in FIG. 4, a tongue portion 124 of the strip of flexible material 62 is extended beyond the shuttle casing 44 and onto the applicator roll 28. An adjustable screw stop 125 may be threaded in the front support bar 22 and extend to the right a predetermined distance to limit the movement of the block 54 and shuttle finger 46 to the left. This then determines how far the tongue portion 124 is extended beyond the shuttle casing 44.

The applicator roll 28 is then elevated to cause the tongue portion 124 of the strip of flexible material 62 to be raised into engagement with the drum surface 36. At this time the clamping piston and cylinder assembly 74 is actuated to lift the clapper plate 70 out of engagement with the strip of flexible material 62 and the drum 12 may then be rotated to wrap the strip of flexible material around a portion of the drum surface 36.

Figure 4:
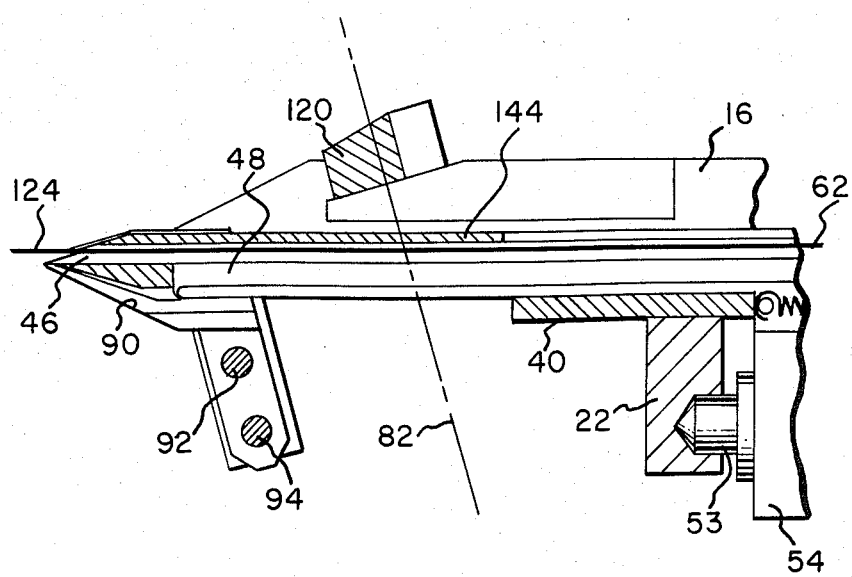
FIG. 4 is an enlarged fragmentary sectional view like FIG. 1 showing the shuttle casing and shuttle finger in the extended position for applying the tongue portion of the strip of flexible material to the applicator roll.

While the strip of flexible material 62 is being wrapped around the drum 12 air may be communicated to the shuttle cylinder 76 causing piston rod 78 to move to the right, as shown in FIG. 1, and the housing block 54 and the attached shuttle finger 46 to move to the right from the third position to the second position where the shuttle finger will engage the stop bar 58 of shuttle casing 44 causing it to move with the shuttle finger to the first position shown in FIGS. 1 and 2. After the drum 12 has been rotated, the clamping piston and cylinder assembly 74 may be actuated to cause the clapper plate 70 to move into engagement with the upper surface of the strip of flexible material 62 clamping it to the shuttle finger 46. As shown in FIGS. 1 and 4, the cutting plane 82 for the air-actuated knife 80 is located between the forward end of the shuttle casing 44 in the first position and the forward end of the shuttle casing in the second position so that the knife may be actuated with the shuttle casing in the first position.

After actuation of the knife 80, the drum 12 is rotated and the trailing end of the strip of flexible material 62 is wrapped around the drum surface to completely encircle the drum 12. The applicator roll 28 may then be lowered by lowering the shaft 24 and the building of the tire on the drum 12 completed or if the drum is a transfer drum, another transfer drum may be moved into place over the applicator roll.

During the movement of the shuttle finger 46 from the first position shown in FIGS. 1 and 2 to the second extended position shown in FIGS. 3 and 4, the tapered sides 102 and 104 of the shuttle casing 44 engage the tapered surfaces 106 and 108 of the front end guides 90 and spread them to allow the forward end of the shuttle casing to move through the front end guides and to a position in close proximity to the applicator roll 28 so that the strip of flexible material 62 will be continuously supported. Then after the shuttle casing 44 is retracted to the position shown in FIG. 2, the front end guides 90 will be returned by springs 110 to the position shown in FIGS. 2 and 5 and guide the trailing end of the strip of flexible material 52 as it is finally wrapped around the drum surface 36.

Suitable controls may be provided to coordinate the various steps of the process described hereinabove. For this purpose a switch actuator 126 may be mounted on the end of the shuttle tie bar 64 and have flanges for engaging an adjustable switch arm 128 of a limit switch 130 mounted on the frame 14 when the shuttle finger 46 reaches the first and third positions to discontinue the operation of the shuttle cylinder 76. After the strip of flexible material 62 is cut the above method of feeding the strip of flexible material for application to the drum surface 36 may be repeated by first lowering the applicator roll 28, actuating the shuttle cylinder 76 to move the shuttle casing 44 and shuttle finger 46 from the first position to the second position, and then move the shuttle finger from the second position to the third position as described hereinabove.

Referring to FIG. 6, the cycle reset clamp assembly 112 is shown in the clamped condition with the clamping rod 114 pressed against the surface of the applicator roll 28 by the piston and cylinder assembly 122. This is especially desirable when there is a malfunction and the strip of flexible material 62 needs to be cut when the applicator roll 28 is in a lowered position and the strip of flexible material must be clamped to allow the shuttle casing to move to the retracted position of FIG. 2 for cutting of the strip of flexible material by the knife 80.

While a certain representative embodiment and details have been shown for the purpose of illustrating the invention, it will be apparent to those skilled in the art that various changes and modifications may be made therein without departing from the spirit of scope of the invention.

What is claimed is:

1. Apparatus for feeding a strip of flexible material for application to a drum surface comprising a supporting structure having an applicator roll for positioning adjacent said drum surface, a shuttle casing slidably mounted on said structure for movement from a first position spaced from said applicator roll to a second position in close proximity to said applicator roll, a shuttle finger for supporting said strip connected to said shuttle casing for sliding movement relative to and with said shuttle casing, clamping means movable with said shuttle finger for clamping said strip to said shuttle finger, means for moving said shuttle casing and said shuttle finger between said first position and said second position, stop means for preventing additional movement of said casing beyond said second position and release means for permitting additional sliding movement of said shuttle finger separately toward said applicator roll to a third position for extending a tongue portion of said strip onto said applicator roll.

2. Apparatus in accordance with claim 1 including cutting means for cutting said strip along a cutting plane at a predetermined location between the forward end of said shuttle casing in said first position and in said second position, said shuttle casing being located at one side of said cutting plane in said first position and being movable through said cutting plane to said second position.

3. Apparatus in accordance with claim 1 including guide means positioned at edges of a predetermined feed path for controlling the location of said strip as it moves along said feed path.

4. Apparatus in accordance with claim 3 wherein said guide means includes a front end guide mounted on said supporting structure along said feed path, said end guide comprising a pair of guide members movable from a retracted position at said edges of said feed path to a spread condition spaced from said edges to permit movement of said shuttle casing from said first position to said second position.

5. Apparatus in accordance with claim 4 including spreading means for said guide members responsive to movement of said shuttle casing from said first position to said second position and resilient means attached to said guide members and to said supporting structure permitting spreading of said guide members and then returning said guide members to said retracted position upon movement of said shuttle casing from said second position to said first position.

6. Apparatus in accordance with claim 5 wherein said spreading means includes tapered sides on said shuttle casing for spreading engagement with said guide members during movement of said casing from said first position to said second position.

7. Apparatus in accordance with claim 6 wherein said guide members are slidably mounted on at least one shaft and said resilient means includes a pair of springs on said shaft and in engagement with said guide members.

8. Apparatus in accordance with claim 1 including a support plate member for supporting said shuttle casing in sliding engagement thereof, said shuttle finger being slidably mounted in said shuttle casing and resilient means connecting said shuttle finger and said shuttle casing for simultaneous movement of said finger and casing between said first position and said second position and stop means for limiting movement of said shuttle casing beyond said second position while permitting continuous movement of said shuttle finger to said third position.

9. Apparatus in accordance with claim 8 wherein said clamping means is connected to said shuttle finger and mounted on said supporting structure for movement simultaneously with said shuttle finger from said first position to said third position, means for actuating said clamping means at said first position to clamp said strip to said finger and means for releasing said clamping means at said third position for permitting wrapping of said strip on said drum surface.

10. Apparatus in accordance with claim 9 wherein said clamping means includes a clapper plate for engaging said strip, a clamp plate connected to said shuttle finger, parallel links connecting said clapper plate and said clamp plate for swinging movement of said clapper plate into engagement with said strip and clamping piston and cylinder means between said clamp plate and said clapper plate for moving said clapper plate into and out of engagement with said strip of material on said shuttle finger.

11. Apparatus in accordance with claim 2 including a cycle reset clamp assembly comprising a clamping rod movable into engagement with the surface of said applicator roll for clamping said strip against said surface during cutting of said strip.

12. Apparatus in accordance with claim 11 wherein said clamping rod is supported by a pair of link members and one of said link members is a bell crank connected to a piston of a piston and cylinder assembly for moving said rod between a clamped position and a retracted storage position.

* * * * *